(12) United States Patent
Park (10) Patent No.: US 8,838,875 B2
(45) Date of Patent: Sep. 16, 2014

(54) SYSTEMS, METHODS AND COMPUTER PROGRAM PRODUCTS FOR OPERATING A DATA PROCESSING SYSTEM IN WHICH A FILE DELETE COMMAND IS SENT TO AN EXTERNAL STORAGE DEVICE FOR INVALIDATING DATA THEREON

(75) Inventor: Chan-Ik Park, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 613 days.

(21) Appl. No.: 12/016,737

(22) Filed: Jan. 18, 2008

(65) Prior Publication Data
US 2008/0195799 A1    Aug. 14, 2008

(30) Foreign Application Priority Data

Feb. 13, 2007   (KR) ................ 10-2007-0014980

(51) Int. Cl.
| | | |
|---|---|---|
| *G06F 12/00* | (2006.01) | |
| *G06F 12/02* | (2006.01) | |
| *G06F 17/30* | (2006.01) | |
| G06F 3/06 | (2006.01) | |
| G06F 12/14 | (2006.01) | |

(52) U.S. Cl.
CPC .......... *G06F 12/0246* (2013.01); *G06F 3/0623* (2013.01); *G06F 3/0652* (2013.01); *G06F 3/0679* (2013.01); *G06F 12/14* (2013.01); *G06F 2212/1052* (2013.01); *G06F 2212/7209* (2013.01); *G06F 17/30117* (2013.01)
USPC .................. 711/103; 711/206; 711/E12.008; 711/E12.059

(58) Field of Classification Search
CPC ... G06F 12/0246; G06F 12/14; G06F 3/0653; G06F 3/0652; G06F 3/0679; G06F 17/30117; G06F 2212/1052; G06F 2212/7209
USPC .................................................. 711/103, 206
See application file for complete search history.

(56) References Cited

U.S. PATENT DOCUMENTS

| | | | | |
|---|---|---|---|---|
| 5,357,475 A | * | 10/1994 | Hasbun et al. ................ | 711/103 |
| 6,014,724 A | * | 1/2000 | Jenett ............................ | 711/103 |
| 6,725,321 B1 | * | 4/2004 | Sinclair et al. ................ | 711/103 |
| 6,845,438 B1 | * | 1/2005 | Tanaka et al. ................. | 711/206 |

(Continued)

FOREIGN PATENT DOCUMENTS

| | | |
|---|---|---|
| CN | 1498409 A | 5/2004 |
| KR | 1020040086500 A | 11/2004 |

(Continued)

*Primary Examiner* — Aracelis Ruiz
(74) *Attorney, Agent, or Firm* — Volentine & Whitt, PLLC (57) ABSTRACT

A data processing system that includes a host system and an external data storage device with an erase before write memory device thereon can be operated by sending a file delete command from the host to the data storage device for one or more files stored thereon. The file delete command may specify a logical address and data to be invalidated associated with the deleted file. The data storage device may identify one or more units of memory allocation in the erase before write memory as containing invalid data based on the specified logical address and data to be invalidated. The data storage device may maintain a data structure that associates physical addresses for units of memory allocation in the erase before write memory with indications of whether the units of memory allocation contain invalid data. The data structure may be used to mark units of memory allocation associated with deleted files as containing invalid data.

16 Claims, 5 Drawing Sheets

(56) References Cited

U.S. PATENT DOCUMENTS

| | | | |
|---|---|---|---|
| 2001/0038032 A1* | 11/2001 | Kang et al. | 235/375 |
| 2003/0097517 A1* | 5/2003 | Haneda | 711/1 |
| 2006/0136676 A1* | 6/2006 | Park et al. | 711/144 |
| 2006/0282446 A1* | 12/2006 | Suzuki et al. | 707/100 |
| 2007/0043900 A1* | 2/2007 | Yun | 711/103 |
| 2007/0277000 A1* | 11/2007 | Ohtsuka | 711/133 |
| 2011/0038032 A1 | 2/2011 | Maki et al. | |

FOREIGN PATENT DOCUMENTS

| | | |
|---|---|---|
| KR | 10-2004-0109826 B1 | 5/2006 |
| WO | 2006062511 | 6/2006 |
| WO | 2006/088723 A2 | 8/2006 |

* cited by examiner

| Logical Address | Physical Address | Invalid Y/N |
|---|---|---|
| 0 | 1 | Y |
| 1 | 2 | Y |
| 2 | 3 | Y |
| 3 | 4 | Y |
| 4 | 5 | N |
| 5 | 6 | N |
| 6 | 7 | N |

Block { (rows 0–3)

SYSTEMS, METHODS AND COMPUTER PROGRAM PRODUCTS FOR OPERATING A DATA PROCESSING SYSTEM IN WHICH A FILE DELETE COMMAND IS SENT TO AN EXTERNAL STORAGE DEVICE FOR INVALIDATING DATA THEREON

CROSS REFERENCE TO RELATED APPLICATION

This application claims the benefit of and priority to Korean Patent Application No. P2007-0014980, filed Feb. 13, 2007, in the Korean Intellectual Property Office, the disclosure of which is hereby incorporated herein by reference as if set forth in its entirety.

BACKGROUND OF THE INVENTION

The present invention relates generally to data processing systems and, more particularly, to the use of storage devices in data processing systems.

Data processing systems may use a file system to store and organize computer files to facilitate access to them. A file system may be viewed as a set of abstract data types that may be used for the storage, organization, manipulation, navigation, access, and retrieval of data. File systems may be categorized into three types: disk file systems, network file systems, and special purpose file systems. Disk file systems are generally designed for the storage of files on a data storage device. Network file systems generally act as a client for a remote file access protocol. Special purpose file systems generally refer to any file system that is not a disk file system or a network file system. A special purpose file system may be, for example, a system in which files are dynamically arranged by software and may be used for communication between computer processes and/or temporary file space.

When a user deletes a file on a computer system, the file system running on the computer processes the delete command and, from the user's point of view, appears to remove the file from memory. In reality, however, conventional file systems leave the file data in physical memory. This is illustrated with reference to the File Allocation Table (FAT) file system in FIG. 1. A host system includes an application program that communicates with a file system 105. The host has a storage system attached thereto. In the FIG. 1 example, the storage device is a flash memory device that includes a Flash Translation Layer (FTL) 110 and a storage device 115 (e.g., a flash memory cell array). The FTL 110 keeps track of the physical location of memory units associated with files in the storage device 115 so the file system 105 need only reference logical memory units.

Figure 1:
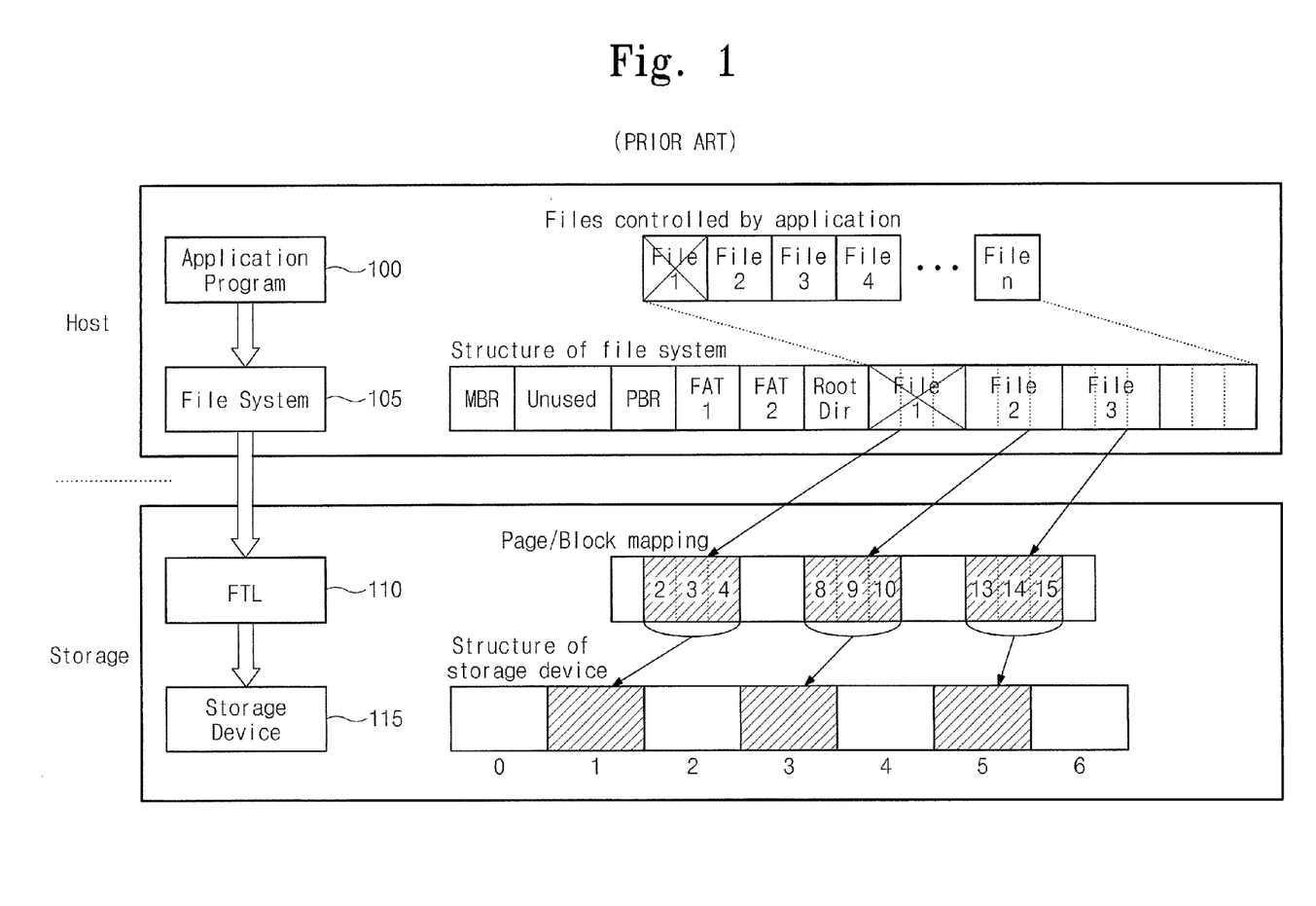
FIG. 1 is a block diagram of a data processing system that illustrates operations involved a conventional file delete.

As shown in FIG. 1, when an application program 100 is used to delete a File 1, the file system 105 removes the name "File 1" from the directory and places a special code in the first character of File 1's FAT entry to indicate that those memory allocation units are available for new files. On the storage system, however, the FTL 110 logically deletes the file, but does not erase the File 1 data from the storage device 115. Instead, the File 1 data remain intact on the storage device 115 and can even be recovered by using, for example, the DOS undelete command followed by the name "File 1." Thus, when a user deletes a file, it is only logically deleted through the file system 105 and the FTL 110. Defragmenting or formatting the storage device may relocate the memory units occupied by a deleted file in the storage device 115, but the file data may still remain intact on the storage device 115. Over time, saving new files on the storage device 115 may cause some, or all, of the deleted files' memory units to be overwritten, but until then, there are many utilities available that can be used to recover the deleted files.

As some files may contain private or sensitive information, a user may prefer to have files deleted on a storage system so that they are unrecoverable before allowing others to access or share that storage system.

SUMMARY

According to some embodiments of the present invention, a host data processing system is operated by sending a file delete command to an external storage device that includes an erase before write memory device for at least one file stored thereon.

In other embodiments, the method further includes detecting a file delete operation on the host and sending the file delete command to the external storage device responsive to detecting the file delete operation.

In still other embodiments, detecting the file delete operation comprises detecting that metadata associated with a file system has been updated with a delete code for a deleted file.

In still other embodiments, the file delete command specifies a logical address and data to be invalidated associated with the deleted file.

In still other embodiments, the storage device is a memory card device, Solid State Drive (SSD) device, ATA bus device, Serial ATA (SATA) bus device, Multi-Media Card (MMC) device, Secure Digital (SD) device, memory stick device, Hard Disk Drive (HDD) device, Hybrid Hard Drive (HHD) device, and/or a Universal Serial Bus (USB) flash drive device, and the host data processing system is a personal digital assistant, computer, digital audio player, digital camera, and/or mobile terminal.

In further embodiments of the present invention, a storage device that includes an erase before write memory device is operated by receiving a file delete command from a host device that specifies a logical address and data to be invalidated for at least one file stored in the erase before write memory device and identifying at least one unit of memory allocation in the erase before write memory as containing invalid data based on the specified logical address and data to be invalidated.

In still further embodiments, identifying the at least one unit of memory allocation in the erase before write memory as containing invalid data includes maintaining a data structure that associates physical addresses for units of memory allocation in the erase before write memory with indications of whether the units of memory allocation contain invalid data and identifying the at least one unit of memory allocation as containing invalid data in the data structure.

In still further embodiments, the storage device includes a Flash Translation Layer (FTL) module that is configured to manage the data structure.

In still further embodiments, the erase before write memory is organized via read/write operation units and erase operation units. The method further includes determining if all of the read/write operation units in one of the erase operation units contain invalid data and performing an erase operation on the one of the erase operation units when all the read/write operation units in the one of the erase operation units contain invalid data.

In still further embodiments, determining if all of the read/write operation units in the one of the erase operation units contain invalid data includes determining that all of the read/write operation units in the one of the erase operation units are indicated as containing invalid data in the data structure.

In still further embodiments, the erase operation on the one of the erase operation units is performed separately from a periodic garbage collection operation performed on the erase before write memory.

In still further embodiments, the data structure associates logical addresses used in the host device with the physical addresses for read/write operation units in the erase before write memory.

In other embodiments of the present invention, a data processing system is operated by sending a file delete command to an external storage device that includes an erase before write memory device, the file delete command specifying a logical address and data to be invalidated for at least one file stored in the erase before write memory device, and identifying at least one unit of memory allocation in the erase before write memory as containing invalid data based on the specified logical address and data to be invalidated.

Although described primarily above with respect to method aspects of the present invention, it will be understood that the present invention may also be embodied as systems and computer program products.

Other systems, methods, and/or computer program products according to embodiments of the invention will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF EMBODIMENTS

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It should be further understood that the terms "comprises" and/or "comprising" when used in this specification is taken to specify the presence of stated features, integers, steps, operations, elements, and/or components, but does not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention may be embodied as methods, systems, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

For purposes of illustration, various embodiments of the present invention are described herein with reference to a flash memory data storage device. It will be understood that the data storage device is not limited to implementation as a flash memory device, but can be implemented generally as an erase before write memory device. Thus, the data storage device may be a memory card device, Solid State Drive (SSD) device, ATA bus device, Serial ATA (SATA) bus device, Multi-Media Card (MMC) device, Secure Digital (SD) device, memory stick device, Hard Disk Drive (HDD) device, Hybrid Hard Drive (HHD) device, and/or a Universal Serial Bus (USB) flash drive device.

Flash memories are often organized in terms of blocks and pages. A typical block may be 32 pages with each page being 512 bytes or 64 pages with each page being 2048 bytes. Each page typically has a few bytes associated therewith that may be used for error detection and/or correction. While a flash memory can be read or programmed in a random access fashion, it must be erased a block at a time. Flash memories may use a page size as a memory unit size for performing a read and/or write operation. Some embodiments of the present invention are described herein in the context of using a page as a read/write operation unit of memory and a block as an erase operation unit of memory. It will be understood that embodiments of the present invention are not limited to pages and blocks as memory operation units. Rather, the unit of memory for performing a read or a write operation may be specified generally as a read/write operation unit and the unit of memory for performing an erase operation may be specified generally as an erase operation unit.

According to some embodiments of the present invention, a data processing system that includes a host system and an external data storage device with an erase before write memory device thereon can be operated by sending a file delete command from the host to the data storage device for one or more files stored thereon. The file delete command may specify a logical address and data to be invalidated associated with the deleted file. The data storage device may identify one or more units of memory allocation in the erase before write memory as containing invalid data based on the specified logical address and data to be invalidated. In some embodiments, the data storage device may maintain a data structure that associates physical addresses for units of memory allocation in the erase before write memory with indications of whether the units of memory allocation contain invalid data. The data structure may be used to mark units of memory allocation associated with deleted files as containing invalid data.

Figure 2:
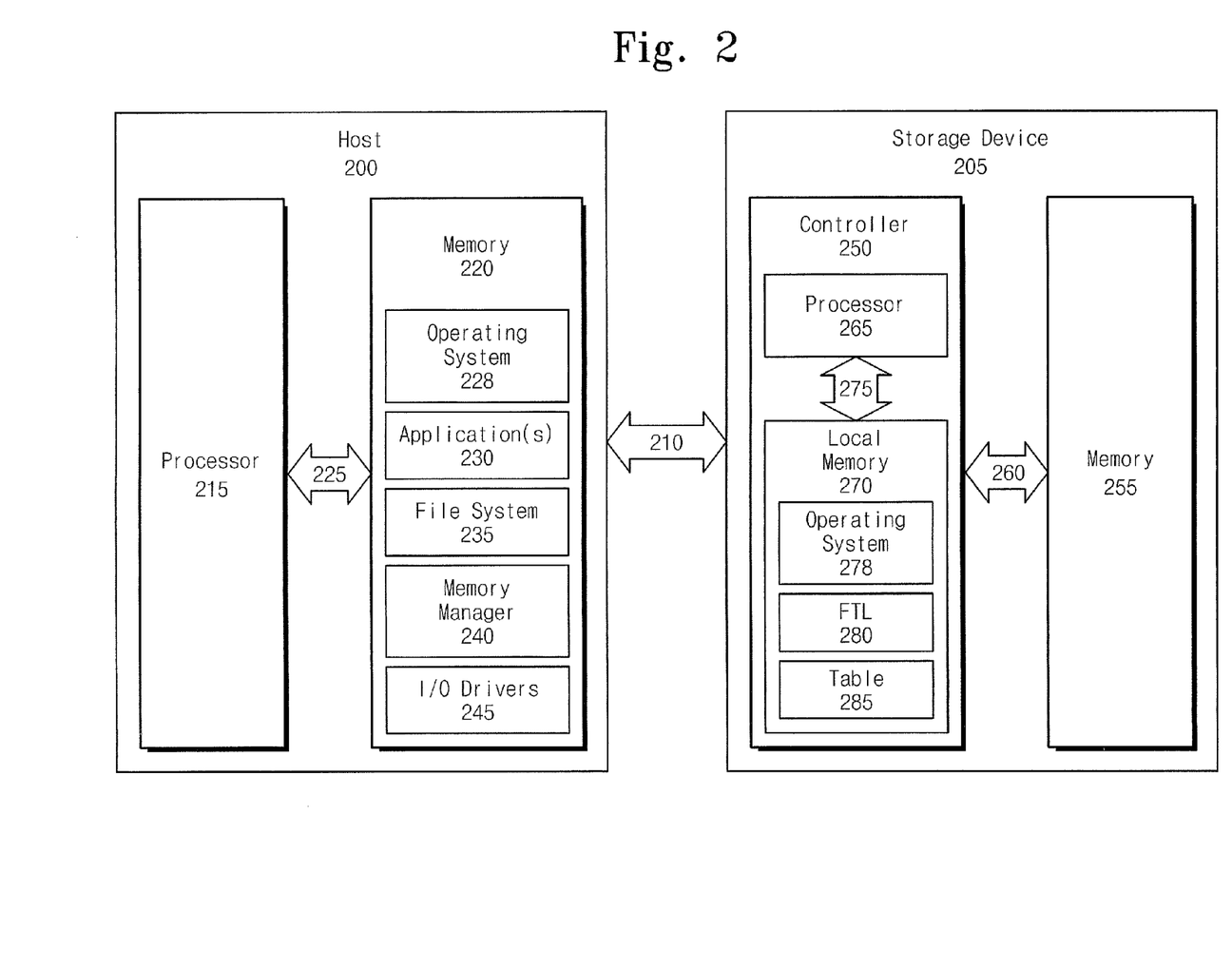
FIG. 2 is a block diagram that illustrates a data processing system in accordance with some embodiments of the present invention.

Referring now to FIG. 2, a data processing system comprises a host 200 and a storage device 205 that are coupled by an interface 210. The interface 210 may be a standardized interface, such as ATA, SATA, PATA, USB, SCSI, ESDI, IEEE 1394, IDE, and/or a card interface. The host 200 comprises a processor 215 that communicates with a memory 220 via an address/data bus 225. The processor 215 may be, for example, a commercially available or custom microprocessor. The memory 220 is representative of the one or more memory devices containing the software and data used to operate the data processing system in accordance with some embodiments of the present invention. The memory 220 may include, but is not limited to, the following types of devices: cache, ROM, PROM, EPROM, EEPROM, flash, SRAM, and DRAM.

As shown in FIG. 2, the memory 220 may contain five or more categories of software and/or data: an operating system 228, application(s) 230, a file system 235, a memory manager 240, and I/O drivers 245. The operating system 228 generally controls the operation of the host 200. In particular, the operating system 228 may manage the host's 200 software and/or hardware resources and may coordinate execution of programs by the processor 215. The application(s) 230 represent the various application programs that may run on the host 200. The file system 235 is the system used for storing and organizing computer files and/or data in the memory 220 and/or in storage locations, such as the storage device 205. The file system 235 used may be based on the particular operating system 228 running on the host 200. The memory manager 240 may manage memory access operations performed in the memory 220 and/or operations performed in an external device, such as the storage device 205. The I/O drivers 245 may be used to transfer information between the host 200 and another device (e.g., storage device 205), computer system, or a network (e.g., the Internet).

In accordance with various embodiments of the present invention, the host 200 may be a Personal Digital Assistant (PDA), a computer, a digital audio player, a digital camera, and/or a mobile terminal.

The storage device 205 comprises a controller 250 that communicates with a memory 255 via an address/data bus 260. The memory 255 may be a variety of different memory types and may be described generally as an erase before write type memory. Thus, the storage device 405 may be a memory card device, Solid State Drive (SSD) device, ATA bus device, Serial ATA (SATA) bus device, Multi-Media Card (MMC) device, Secure Digital (SD) device, memory stick device, Hard Disk Drive (HDD) device, Hybrid Hard Drive (HHD) device, and/or a Universal Serial Bus (USB) flash drive device in accordance with various embodiments of the present invention. The controller 250 comprises a processor 265 that communicates with a local memory 270 via an address/data bus 275. The processor 265 may be, for example, a commercially available or custom microprocessor. The local memory 270 is representative of the one or more memory devices containing the software and data used to operate the storage device 205 in accordance with some embodiments of the present invention. The local memory 470 may include, but is not limited to, the following types of devices: cache, ROM, PROM, EPROM, EEPROM, flash, SRAM, and DRAM.

As shown in FIG. 2, the local memory 270 may contain three or more categories of software and/or data: an operating system 278, a Flash Translation Layer (FTL) module 280, and a table 285. The operating system 278 generally controls the operation of the storage device 205. In particular, the operating system 278 may manage the storage device's 205 software and/or hardware resources and may coordinate execution of programs by the processor 265. The FTL module 280 may be used in flash memory devices. As discussed above, a flash chip is erased in units of blocks. The typical lifetime of a flash memory is around 100,000 erase operations per block. To avoid having one portion of a flash memory wear out sooner than another, flash devices are generally designed to distribute erase cycles around the memory, which may be called "wear leveling." The FTL module 280 may be used as an interface between the file system 235 and the location of files/data in the memory 255 so that the file system 235 does not have to keep track of the actual location of files/data in the memory 255 due to wear leveling. The table 285 may be maintained by the FTL module 280 and may be used to associate physical addresses for units of memory allocation in the memory 255 with indications of whether the units of memory allocation contain invalid data.

Figure 3:
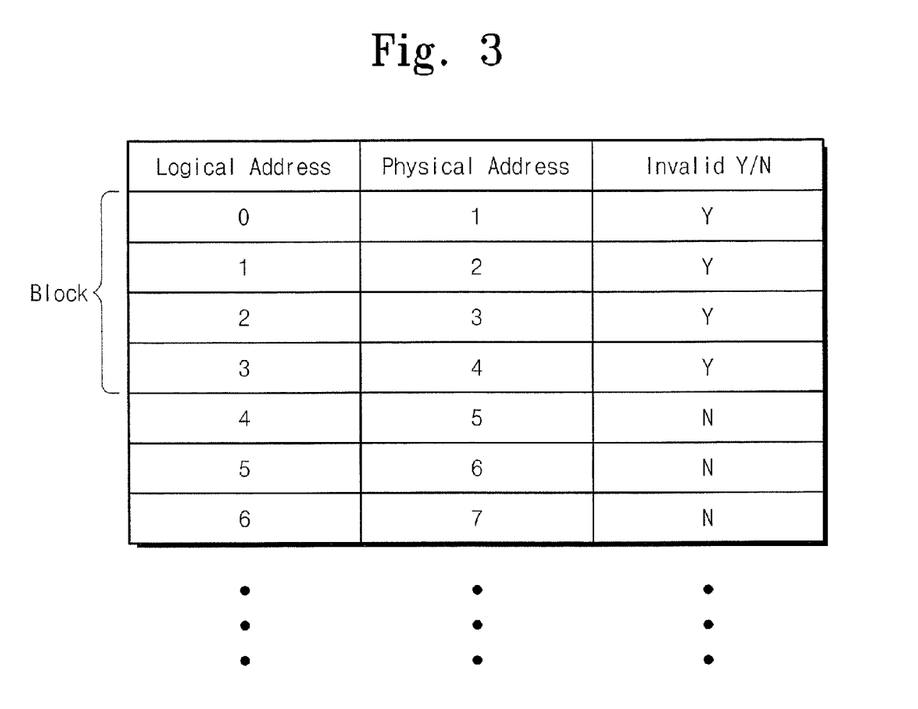
FIG. 3 is a block diagram that illustrates a data structure for associating units of memory allocation in a storage device with an indication of whether the units of memory allocation contain valid or invalid data in accordance with some embodiments of the present invention.

An example of the table 285 is shown in FIG. 3 for a flash type memory in which a page is used as a unit of memory allocation and a block comprises fur pages. As shown in FIG. 3, the table 285 associates the physical addresses of pages in the flash memory 255 with the logical addresses used by the file system 235. Moreover, the table 285 includes a column that indicates whether each particular page in the flash memory 255 contains invalid data or valid data. In the example shown, the block of pages comprising logical addresses 0-3 contain invalid data and, therefore, can be erased. The table 285 may be used to trigger an erase operation when all of the pages in a block are determined to contain invalid data. Conventionally, for example, if a second write operation was attempted on logical address page address 0, then it can be concluded that logical page address 0 contains invalid data. It is not clear, however, whether logical page addresses 1-3 also contain invalid data. Therefore, to free up logical page address 0, the data in logical page addresses 1-3 is copied elsewhere so the entire block comprising logical page addresses 0-3 can be erased. This copy operation may be unnecessary if logical page addresses 1-3 contain invalid data. The table 285 may provide an indication of which pages contain invalid data to reduce unnecessary copy operations as described above. Although illustrated herein as a table, it will be understood that the table 285 may be implemented as other types of data structures in accordance with various embodiments of the present invention.

Although FIG. 2 illustrates a data processing system software architecture in accordance with some embodiments of the present invention, it will be understood that the present invention is not limited to such a configuration but is intended to encompass any configuration capable of carrying out operations described herein.

Computer program code for carrying out operations of devices and/or systems discussed above with respect to FIG. 2 may be written in a high-level programming language, such as Java, C, and/or C++, for development convenience. In addition, computer program code for carrying out operations of embodiments of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

The present invention is described hereinafter with reference to message flow, flowchart and/or block diagram illustrations of methods, systems, devices, and/or computer program products in accordance with some embodiments of the invention. These message flow, flowchart and/or block diagrams further illustrate exemplary operations for operating a data processing system that includes an external data storage device. It will be understood that each message/block of the message flow, flowchart and/or block diagram illustrations, and combinations of messages/blocks in the message flow, flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the message flow, flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the message flow, flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the message flow, flowchart and/or block diagram block or blocks.

Figure 4:
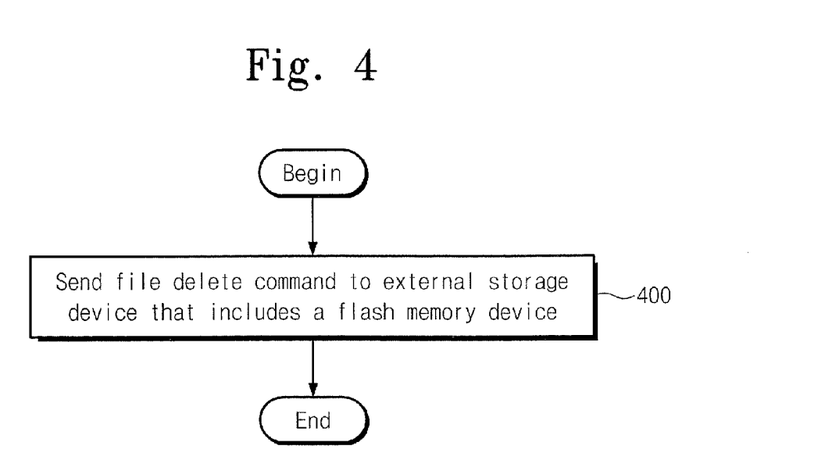
FIGS. 4-8 are flowcharts that illustrate operations of the data processing system of FIG. 2 in accordance with some embodiments of the present invention.
Figure 5:
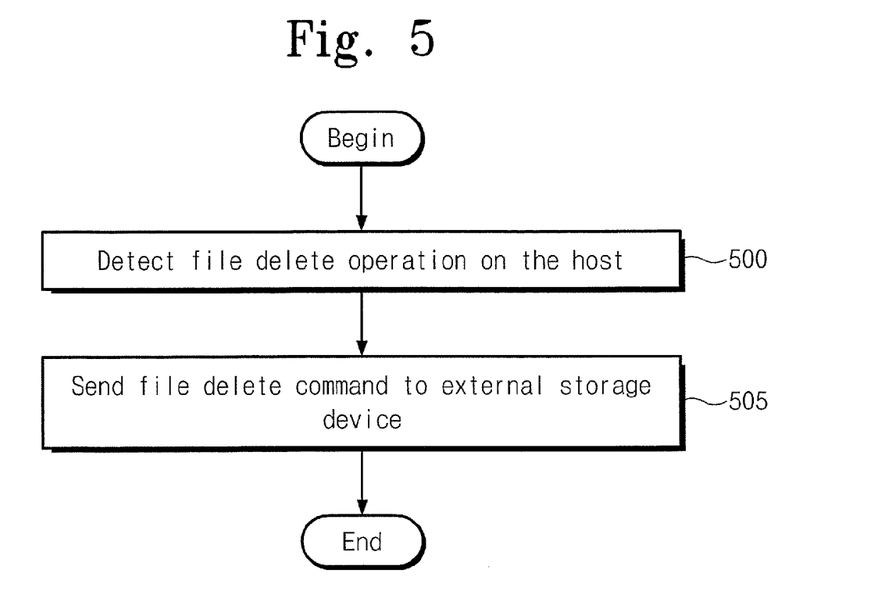

Referring to FIG. 4, operations begin at block 400 where the host data processing system 200 sends a file delete command for one or more files to the external storage device 205, which includes an erase before write memory device, such as a flash memory device. In accordance with various embodiments of the present invention illustrated in FIG. 5, a file delete operation may be detected on the host 200 at block 500. This may be done, for example, by detecting that metadata associated with a file system has been updated with a delete code for a deleted file. In response to detecting the file delete operation on the host 500, the file delete command can be sent to the external storage device 205. In some embodiments, the file delete command can specify a logical address and data to be invalided that are associated with the deleted file.

Figure 6:
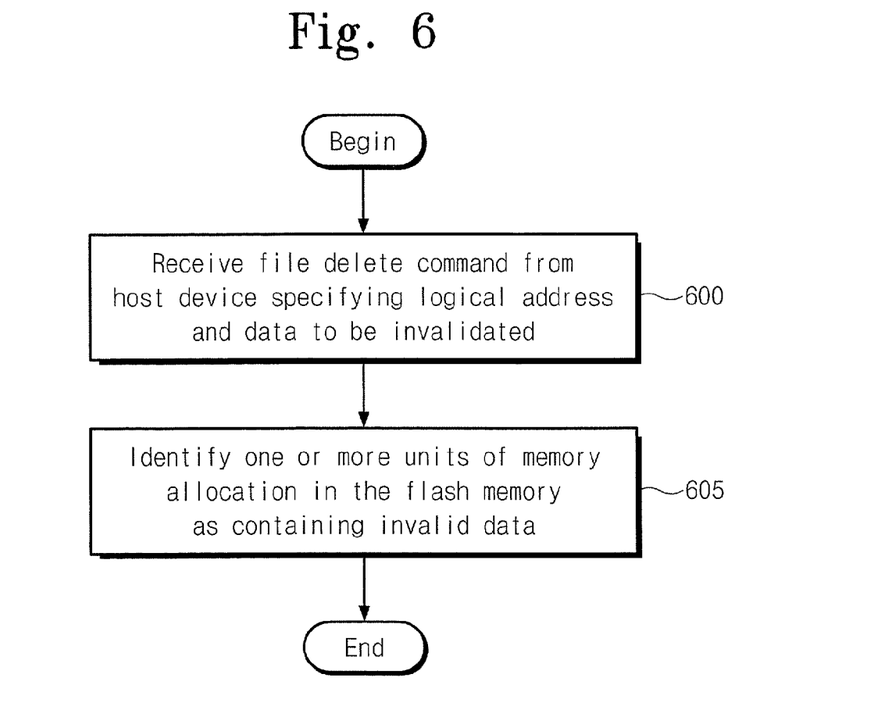
Figure 7:
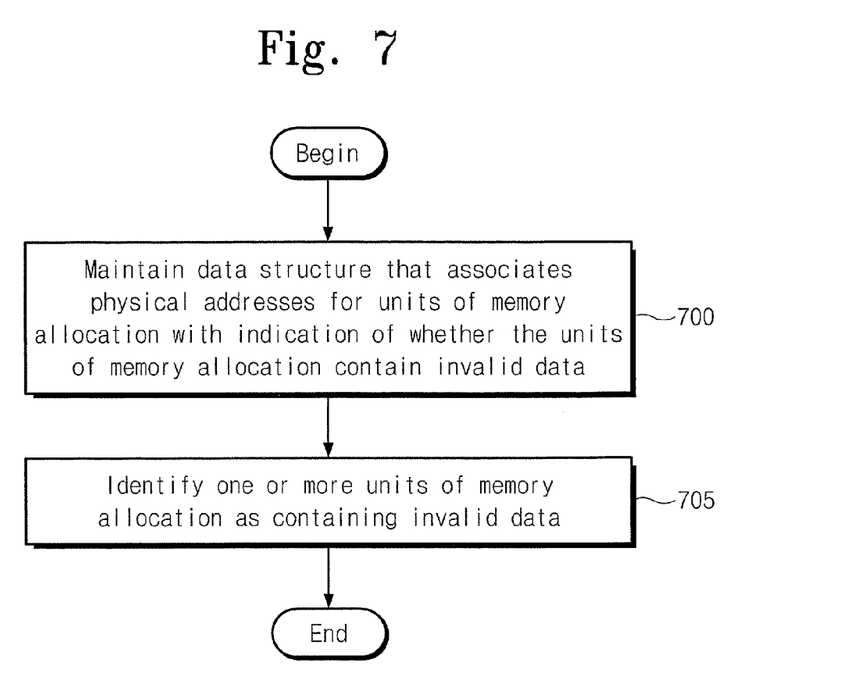

Referring to FIG. 6, exemplary file delete operation on the external storage device 205 begin at block 600 where the file delete command that specifies the logical address and data to be invalidated for one or more files is received from the host 200. The storage device 205 identifies one or more units of memory allocation in the memory 255 as containing invalid data based on the specified logical address and data to be invalidated. In some embodiments illustrated in FIG. 7, the FTL module 280 may maintain a data structure, such as the table 285 shown in FIG. 3, that associates logical addresses with physical addresses for the units of memory allocation in the memory 255 at block 700. The data structure may also include an indication of whether the various units of memory allocation contain invalid data. When a physical address of a unit of memory allocation is identified as being associated with a deleted file, the FTL module 280 may update the data structure to indicate that the identified unit of memory allocation contains invalid data at block 705.

Figure 8:
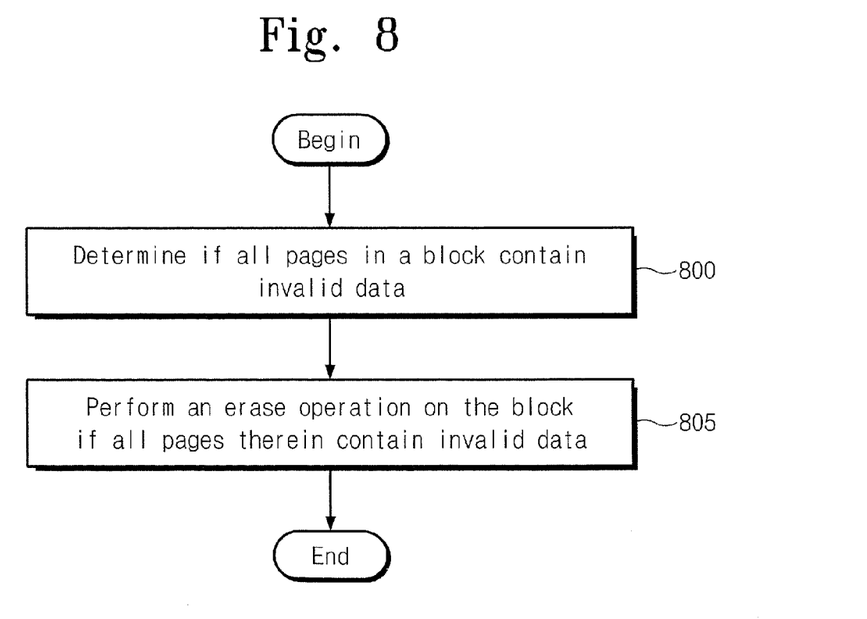

As various memory operations are performed on the storage device, it may be desirable to perform a "garbage collection" operation to form larger blocks of free, contiguous memory. In accordance with some embodiments of the present invention, rather than wait for the operating system 228 of the host 200 or the operating system 278 of the storage device 205 to trigger a periodic garbage collection operation, the FTL module 280 may use the table 285 to determine when to collect memory units that contain invalid data. Referring to FIG. 8, the FTL module 280 may determine if all of the read/write operation units (e.g., pages for a flash memory device) in an erase operation unit (e.g., block for a flash memory device) contain invalid data by examining the invalid data field (see FIG. 3) for each of the read/write operation units at block 800. At block 805, an erase operation on the erase operation unit can be performed once all of the read/write operation units are marked as containing invalid data. In this way, the actual physical file data may be erased as soon as an erase operation unit is ready for erasure. This may be desirable for applications involving personal or sensitive data as the physical erasure of a file from a storage device memory may be done more quickly than waiting for the file to be erased by chance due to multiple file write operations being performed on the storage device.

The flowcharts of FIGS. 4-8 illustrate the architecture, functionality, and operations of some embodiments of methods, systems, and computer program products for operating a data processing system that includes an external data storage device. In this regard, each block represents a module, segment, or portion of code, which comprises one or more executable instructions for implementing the specified logical function(s). It should also be noted that in other implementations, the function(s) noted in the blocks may occur out of the order noted in FIG. 4-8. For example, two blocks shown in succession may, in fact, be executed substantially concur- That which is claimed:

1. A method of operating a storage device that includes an erase before write memory device and a controller controlling the erase before write memory device, the method comprising:

maintaining a data structure, in the controller, that associates logical addresses received from an external device with physical addresses for units of memory allocation in the erase before write memory device, each of the units of memory allocation corresponding to a read/write operation unit of the erase before write memory device, and that includes indications of whether each data stored in the units of memory allocation corresponding to the physical addresses is invalid data deleted by an operating system driven on the external device;

receiving a file delete command including a logical address invalidated from the operating system, the logical address being assigned to a physical address corresponding to at least one unit of memory allocation; and identifying the at least one unit of memory allocation in the erase before write memory as containing invalid data by updating the data structure in the controller, wherein the read/write operation unit and each unit of memory allocation is a page, and the data structure associates logical addresses with physical addresses by the unit of the page.

2. The method of claim 1, wherein the controller drives a Flash Translation Layer (FTL) module that is configured to manage the data structure.

3. The method of claim 1, wherein the erase before write memory device is organized via read/write operation units and erase operation units, the method further comprising:

determining if all of the read/write operation units in one of the erase operation units contain invalid data; and performing an erase operation on the one of the erase operation units when all the read/write operation units in the one of the erase operation units contain invalid data.

4. The method of claim 3, wherein determining if all of the read/write operation units in the one of the erase operation units contain invalid data comprises:

determining that all of the read/write operation units in the one of the erase operation units are indicated as containing invalid data in the data structure.

5. The method of claim 3, wherein the erase operation on the one of the erase operation units is performed separately from a periodic garbage collection operation performed on the erase before write memory device.

6. The method of claim 3, wherein the data structure associates logical addresses used in the external device with the physical addresses for read/write operation units in the erase before write memory device.

7. The method of claim 1, wherein a read operation unit of the erase before write memory is the same with a write unit of the erase before write memory.

8. A method of operating a data processing system, comprising:

sending a file delete command including a logical address to be invalidated from an operating system driven on an external device to a storage device that includes an erase before write memory device and a controller controlling the erase before write memory device, the logical address being assigned to a physical address corresponding to at least one unit of memory allocation in the erase before write memory device; and identifying at least one unit of memory allocation in the erase before write memory device as containing invalid data based on the logical address, each unit of memory allocation corresponding to a read/write operation unit of the erase before write memory device, wherein identifying the at least one unit of memory allocation in the erase before write memory device as containing invalid data comprises:

maintaining a data structure, in the controller, that associates logical addresses received from the external device with physical addresses for units of memory allocation in the erase before write memory device, and that includes indications of whether data stored in each of the units of memory allocation corresponding to the physical addresses is invalid data; and identifying the at least one unit of memory allocation as containing invalid data in the data structure by updating the data structure in the controller, wherein the read/write operation unit and each unit of memory allocation is a page, and the data structure associates logical addresses with physical addresses by the unit of the page.

9. The method of claim 8, wherein a read operation unit of the erase before write memory is the same with a write unit of the erase before write memory.

10. A storage device, comprising:

an erase before write memory device;

a memory management module that is configured to receive a file delete command including a logical address to be invalidated from an operating system driven on an external device, the logical address being assigned to a physical address corresponding to at least one of units of memory allocation in the erase before write memory device, each of the units of memory allocation corresponding to a read/write operation unit of the erase before write memory device, and to identify at least one unit of memory allocation in the erase before write memory device as containing invalid data based on the logical address, wherein the memory management module drives a translation module configured to manage a data structure which associates logical addresses received from the external device with physical addresses for units of memory allocation in the erase before write memory device, and that includes indications of whether data stored in the units of memory allocation corresponding to the physical addresses is invalid data, and wherein the at least one unit of memory allocation is identified as containing invalid data by updating the data structure in the memory management module.

11. The storage device of claim 10, wherein the erase before write memory device is organized via read/write operation units and erase operation units, and wherein the memory management module is further configured to determine if all of the read/write operation units in one of the erase operation units contain invalid data, and to perform an erase operation on the one of the erase operation units when all the read/write operation units in the one of the erase operation units contain invalid data.

12. The storage device of claim 11, wherein the memory management module is further configured to determine that all of the read/write operation units in the one of the erase operation units are indicated as containing invalid data in the data structure.

13. The storage device of claim 11, wherein the memory management module is further configured to perform the erase operation on the one of the erase operation units separately from a periodic garbage collection operation performed on the erase before write memory device.

14. The storage device of claim 11, wherein the data structure associates logical addresses used in the external device with the physical addresses for read/write operation units in the erase before write memory device.

15. The storage device of claim 10, wherein the storage device is a memory card device, Solid State Drive (SSD) device, ATA bus device, Serial ATA (SATA) bus device, Multi-Media Card (MMC) device, Secure Digital (SD) device, memory stick device, Hard Disk Drive (HDD) device, Hybrid Hard Drive (HHD) device, and/or a Universal Serial Bus (USB) flash drive device.

16. The storage device of claim 10, wherein a read operation unit of the erase before write memory is the same with a write unit of the erase before write memory.

* * * * *